United States Patent
Miyoshi et al.

[11] Patent Number: 5,948,376
[45] Date of Patent: *Sep. 7, 1999

[54] CATALYST FOR PURIFYING EXHAUST GASES

[75] Inventors: Naoto Miyoshi, Nagoya; Tuneyuki Tanizawa; Kazunobu Ishibashi, both of Toyota; Koichi Kasahara; Syuji Tateishi, both of Ogasa-gun, all of Japan

[73] Assignees: Toyota Jidosha Kabushiki Kaisha, Toyota; Cataler Industrial Co., Ltd., Ogasa-gun, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,789

[22] Filed: Mar. 14, 1996

Related U.S. Application Data

[63] Continuation of application No. 08/380,686, Jan. 30, 1995, abandoned.

[30] Foreign Application Priority Data

Feb. 4, 1994 [JP] Japan ................................. 6-012754

[51] Int. Cl.[6] .............................. B01J 23/63; B01J 23/58
[52] U.S. Cl. .................................. 423/213.5; 423/213.2; 423/239.1; 502/304; 502/326; 502/330
[58] Field of Search .................................. 502/304, 326; 423/213.5, 213.2, 239.1

[56] References Cited

U.S. PATENT DOCUMENTS

| | | | |
|---|---|---|---|
| 4,369,132 | 1/1983 | Kinoshita et al. | 502/261 |
| 4,426,365 | 1/1984 | Magder | 502/34 |
| 4,678,770 | 7/1987 | Wan et al. | 502/304 |
| 4,931,419 | 6/1990 | Blanchard et al. | 423/213.5 |
| 5,388,406 | 2/1995 | Takeshima et al. | 60/297 |

FOREIGN PATENT DOCUMENTS

| | | |
|---|---|---|
| A-0 171 151 | 2/1986 | European Pat. Off. . |
| A-0 199 509 | 10/1986 | European Pat. Off. . |
| A-0 372 156 | 6/1990 | European Pat. Off. . |
| 0573672 | 7/1993 | European Pat. Off. . |
| A-0 613 714 | 9/1994 | European Pat. Off. . |
| 5-168860 | 7/1993 | Japan . |

*Primary Examiner*—Bekir L. Yildirim
*Attorney, Agent, or Firm*—Oliff & Berridge, PLC

[57] ABSTRACT

A catalyst for purifying exhaust gases includes a porous support, an $NO_x$ storage component including at least one member selected from the group consisting of alkaline-earth metals, rare-earth elements and alkali metals, and loaded on the porous support, a noble metal catalyst ingredient loaded on the porous support, and disposed adjacent to the $NO_x$ storage component, and ceria ($CeO_2$) disposed away from the noble metal catalyst ingredient. By disposing the noble metal catalyst ingredient adjacent to the $NO_x$ storage component, the reduction reactions of $NO_x$ can be facilitated in fuel-rich (i.e., oxygen-lean) atmospheres without being interfered by the ceria. By disposing the ceria away from the noble metal catalyst ingredient, oxygen, which has been stored thereon in fuel-lean (i.e., oxygen-rich) atmospheres, can be released from the ceria at a controlled rate in a controlled amount in fuel-rich (i.e., oxygen-lean) atmospheres, and thereby the released oxygen can be inhibited from reacting with HC and CO in fuel-rich (i.e., oxygen-lean) atmospheres. Thus, the catalyst is improved in terms of $NO_x$ purifying performance.

32 Claims, 1 Drawing Sheet

CATALYST FOR PURIFYING EXHAUST GASES

This is a Continuation of application Ser. No. 08/380,686 filed Jan. 30, 1995, now abandoned.

BACKGROUND OF THE INVENTION

1. Field of the Invention

The present invention relates to a catalyst for purifying exhaust gases. More particularly, it relates to the catalyst which can efficiently purify nitrogen oxides ($NO_x$) in the exhaust gases whose oxygen concentrations are at the stoichiometric point or more than required for oxidizing carbon monoxide (CO) and hydrocarbons (HC) therein.

2. Description of Related Art

As catalysts for purifying automotive exhaust gases, there have been employed 3-way catalysts so far which oxidize CO and HC and reduce $NO_x$ to purify the exhaust gases. For example, the 3-way catalysts have been known widely which comprise a heat resistant support formed of cordierite, a catalyst carrier layer formed of gamma-alumina and disposed on the support, and a noble metal catalyst ingredient selected from the group consisting of Pt, Pd and Rh and loaded on the catalyst carrier layer.

The purifying performance of the 3-way catalysts for purifying exhaust gases depends greatly on the air-fuel ratio A/F of automotive engine. For instance, when the air-fuel weight ratio is larger than 14.6, i.e., when the fuel concentration is low (or on the fuel-lean side), the oxygen concentration is high in exhaust gases. Accordingly, the oxidation reactions purifying CO and HC are active, but the reduction reactions purifying $NO_x$ are inactive. On the other hand, when the air-fuel ratio is smaller than 14.6, i.e., when the fuel concentration is higher (or on the fuel-rich side), the oxygen concentration is low in exhaust gases. Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even on the fuel-lean side (i.e., in the oxygen-rich atmospheres).

In view of the aforementioned circumstances, the applicants et al. of the present invention proposed a novel catalyst in Japanese Unexamined Patent Publication (KOKAI) No. 5-168,860. On this catalyst, there are loaded an $NO_x$ storage component, such as La and the like, and Pt. In the catalyst, during the fuel-lean side driving where the exhaust gas contains oxygen excessively (i.e., in the oxygen-rich atmospheres), $NO_x$, which includes NO in an amount of about 90% by volume and the balance of $NO_2$ etc., especially the NO is oxidized to $NO_2$ by Pt. Then, the $NO_2$ is stored on the $NO_x$ storage component, such as La and the like. When the air-fuel ratio A/F of the air-fuel mixture is varied to the stoichiometric point or the fuel-rich side, the stored $NO_2$ is released. Further, on the Pt, the released $NO_2$ is reacted with the reducing gases, such as HC and CO, included in the exhaust gases, and thereby the $NO_2$ is reduced and purified to $N_2$. As a result, the $NO_x$ is inhibited from being released from the catalyst during the fuel-lean side (i.e., in the oxygen-rich atmospheres) driving. Thus, the catalyst is improved in terms of $NO_x$ purifying performance.

When exhaust-gases-purifying catalysts are used actually, it is necessary for them to exhibit 3-way catalytic performance. That is, they are required to simultaneously carry out the oxidation of HC and CO and the reduction of $NO_x$ at the stoichiometric point. However, even when the air-fuel mixture is said to have the stoichiometric point, its air-fuel ratio A/F varies in the acceleration and deceleration during driving in urban areas. Namely, the air-fuel mixture may be put into the fuel-lean state, and thereby it may include oxygen excessively. Consequently, exhaust-gases-purifying catalysts do not cause the reduction of $NO_x$ but to carry out the adsorption of $NO_x$. If the $NO_x$ is stored saturatedly, exhaust-gases-purifying catalysts cannot store $NO_x$ any further, but release $NO_x$ to the outside as it is.

On conventional 3-way exhaust-gases-purifying catalysts, a substance having oxygen-storage ability, such as ceria ($CeO_2$) and the like, can be loaded together with a noble metal catalyst ingredient in order to store oxygen in the oxygen-rich atmospheres (i.e., during the fuel-lean side driving), thereby facilitating the reduction reactions of $NO_x$. Ceria can store and release oxygen by itself. That is, ceria can store oxygen in the oxygen-rich atmospheres (i.e., during the fuel-lean side driving), and it can release oxygen in the oxygen-lean atmospheres (i.e., during the fuel-rich side driving). When ceria is loaded adjacent to a noble metal catalyst ingredient, oxygen comes in and goes out at a great rate in a large amount. Accordingly, ceria buffers or reduces the fluctuation in the air-fuel ratio A/F, and it can maximize the oxidation and reduction activity of noble metal catalyst ingredient.

Hence, one can readily think of further loading ceria together with a noble metal catalyst ingredient on a catalyst with an $NO_x$ storage component loaded. If such an attempt is made, the air-fuel ratio A/F could be fluctuated less from the stoichiometric point, and oxygen could be stored in the oxygen-rich atmospheres (i.e., during the fuel-lean side driving) to establish reducing atmospheres which contain less oxygen, thereby facilitating the reduction reactions of $NO_x$.

However, according to a series of experiments conducted by the inventors of the present invention, it was revealed that, in catalysts on which not only an $NO_x$ storage component and a noble metal catalyst ingredient, but also ceria are loaded, the $NO_x$ conversion is adversely affected to deteriorate in reducing atmospheres when ceria is loaded adjacent to a noble metal catalyst ingredient. It is believed that the disadvantage results from the fact that ceria releases oxygen at a great rate in a large amount in reducing atmospheres, and that the thus released oxygen oxidizes HC and CO so as to decrease HC and CO which contribute to the reduction reactions of $NO_x$.

SUMMARY OF THE INVENTION

The present invention has been developed in view of the aforementioned circumstances. It is therefore an object of the present invention to provide a catalyst on which not only an $NO_x$ storage component and a noble metal catalyst ingredient are loaded, but also ceria is loaded so as not to be adjacent to the noble metal catalyst ingredient. Thus, it is possible to minimize a rate and an amount of oxygen being released from ceria in reducing atmospheres, and to control the oxidation reactions of HC and CO resulting from the released oxygen, thereby facilitating the reduction reactions of $NO_x$.

In accordance with the present invention, a catalyst can solve the aforementioned problems. A catalyst for purifying exhaust gases according to the present invention comprises:

a porous support;

an $NO_x$ storage component including at least one member selected from the group consisting of alkaline-earth metals, rare-earth elements and alkali metals, and loaded on the porous support;

a noble metal catalyst ingredient loaded on the porous support, and disposed adjacent to the $NO_x$ storage component; and ceria ($CeO_2$) disposed away from the noble metal catalyst ingredient.

As for the porous support, the following porous substances can be listed as examples: alumina, zeolite, zirconia, silica-alumina, silica and the combinations of them. These porous substances themselves can constitute a porous support, or they can be coated on a surface of a honeycomb body made from cordierite, heat resistant metal, etc.

As for the alkaline-earth metals constituting the $NO_x$ storage component, it is possible to select at least one alkaline-earth metal from the group consisting of barium (Ba), beryllium (Be), magnesium (Mg), calcium (Ca) and strontium (Sr).

As for the rare-earth elements constituting the $NO_x$ storage component, it is possible to select at least one rare-earth element from the group consisting of scandium (So), yttrium (Y), lanthanum (La), cerium (Ce), praseodymium (Pr) and neodymium (Nd). Unless otherwise specified, the term, "rare-earth elements," herein includes not only the chemical elements with atomic numbers 58 through 71, but also $_{21}Sc$, $_{39}Y$ and $_{57}La$.

As for the alkali metals constituting the $NO_x$ storage component, it is possible to select at least one alkali metal from the group consisting of lithium (Li), sodium (Na), potassium (K), rubidium (Rb), cesium (Cs) and francium (Fr).

It is preferred to load the $NO_x$ storage component in amount of from 0.025 to 0.5 moles with respect to 1 liter of the porous support.

As for the noble metal catalyst ingredient, it is possible to select at least one noble metal element from the group consisting of Pt, Rh and Pd.

It is preferred to load the noble metal catalyst ingredient in an amount of from 0.1 to 20 grams, further preferably from 0.5 to 10 grams, with respect to 1 liter of the porous support.

It is preferred to load the ceria in an amount of from 0.025 to 0.5 moles, further preferably from 0.05 to 0.30 moles, with respect to 1 liter of the porous support.

The operations of the present catalyst will be hereinafter described. As mentioned earlier, when ceria is loaded adjacent to a noble metal catalyst ingredient, the oxygen-storage or oxygen-release capability of ceria is maximized, and thereby ceria stores or releases oxygen at a great rate in a large amount. In the present catalyst, however, the noble metal catalyst ingredient is disposed adjacent to the $NO_x$ storage component, not adjacent to the ceria. Accordingly, the ceria releases oxygen at a low rate in a small amount in reducing atmospheres. As a result, HC and CO are inhibited from reacting with the released oxygen and from being oxidized before they react with $NO_x$. That is, there occur the reactions between the released $NO_x$ and HC as well as CO, and thereby the $NO_x$ is purified. In addition, since the oxygen-storage or oxygen-release capability of the ceria is kept as it is, the reduction reactions of $NO_x$ can be facilitated even when the air-fuel ratio A/F of the fuel-air mixture fluctuates from the stoichiometric point. In particular, when the stoichiometric air-fuel ratio A/F fluctuates to the oxygen-rich side (i.e., the fuel-lean side), the oxygen-storage action of the ceria produces reducing atmospheres, and thereby the reduction reactions of $NO_x$ are facilitated. All in all, the present catalyst can be improved in terms of $NO_x$ purifying performance.

Thus, in accordance with the present invention, it is possible to inhibit ceria from releasing oxygen at a greater rate in a large amount in reducing atmospheres. Accordingly, it is possible to inhibit HC and CO from being consumed unnecessarily. As a result, it is possible to facilitate the reduction reactions of $NO_x$ caused by HC and CO, thereby giving the present exhaust-gases-purifying catalyst high $NO_x$ purifying performance. In addition, the air-fuel ratio A/F of fuel-air mixture can be controlled to fluctuate less by loading ceria. In particular, ceria stores oxygen to produce reducing atmospheres in the oxygen-rich atmospheres (i.e., during the fuel-lean driving). As a result, it is possible to further facilitate the reduction reactions of $NO_x$. All in all, the present exhaust-gases-purifying catalyst is further upgraded in terms of $NO_x$ purifying performance.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The present invention will be hereinafter detailed by means of the following preferred embodiments. Unless otherwise specified, the term, "parts," hereinafter means "parts by weight."

First Preferred Embodiment

Figure 1:
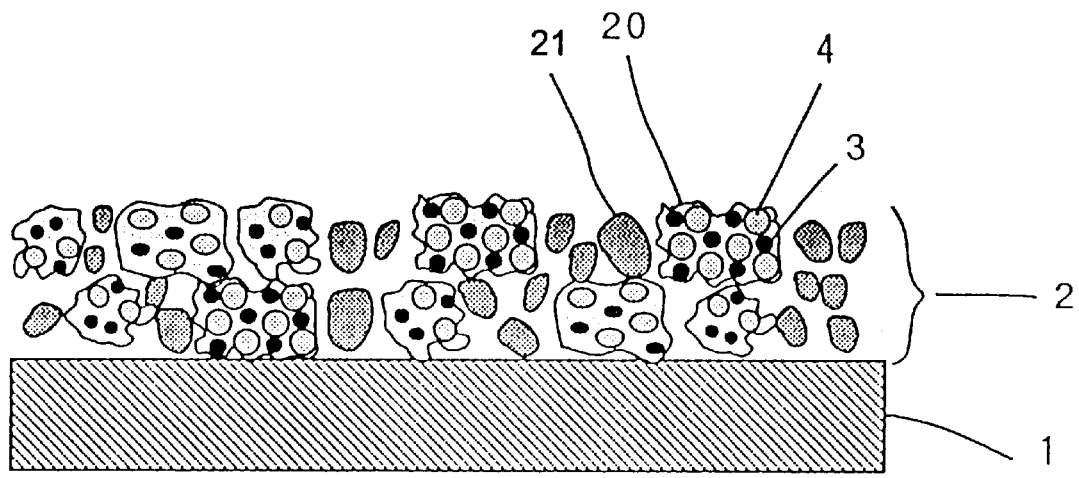
FIG. 1 is an enlarged cross-sectional view on a major portion of an exhaust-gases-purifying catalyst of a preferred embodiment according to the present invention.

In FIG. 1, there is illustrated an enlarged cross-sectional view on a major portion of an exhaust-gases-purifying catalyst of a First Preferred Embodiment according to the present invention. This exhaust-gases-purifying catalyst comprises a honeycomb substrate 1 made from cordierite, and a coating layer 2 coated on the surface of the honeycomb substrate 1.

The coating layer 2 is formed by calcinating an alumina powder 20 and a ceria powder 21. On the alumina powder 20, there are loaded Pt and Ba designated, respectively, at 3 and 4. That is, Pt (designated at 3) is loaded adjacent to Ba (designated at 4) working as the $NO_x$ storage component.

The exhaust-gases-purifying catalysts of the First Preferred Embodiment were produced in the following manner.

First of all, an alumina powder was added to a platinum dinitrodiammine aqueous solution. After stirring the mixture, the alumina powder was dried and calcinated, thereby loading Pt thereon. Moreover, the resulting alumina catalyst of a Sixth Preferred Embodiment according to the present invention. This exhaust-gases-purifying catalyst comprises, similarly to those of the First Preferred Embodiment, a honeycomb substrate 1 made from cordierite, and a coating layer 2 coated on the surface of the honeycomb substrate 1.

TABLE 1

|  | Noble Metal Catalyst Ingredient Loading Amount (gram/Liter) | | Oxygen Storager-Releaser Loading Amount (mole/liter) | NOx Storage Component Loading Amount (mole/liter) | | | | | Initial Conversion (%) | | | Conversion after Durability Test (%) | | |
| --- | --- | --- | --- | --- | --- | --- | --- | --- | --- | --- | --- | --- | --- | --- |
|  | Pt | Fd | $CeO_2$ | Ba | La | Li | K | Na | NOx | HC | CO | NOx | HC | CO |
| 1st Pref. Embodiment | 1.0 | — | 0.2 | 0.2 | — | — | — | — | 93 | 97 | 100 | 62 | 95 | 99 |
| 2nd Pref. Embodiment | 1.0 | — | 0.2 | — | 0.2 | — | — | — | 90 | 99 | 100 | 60 | 99 | 99 |
| 3rd Pref. Embodiemnt | 1.0 | — | 0.2 | — | — | 0.2 | — | — | 90 | 96 | 100 | 61 | 94 | 99 |
| 4th Pref. Embodiment | 1.0 | — | 0.2 | — | — | — | 0.2 | — | 92 | 96 | 100 | 63 | 93 | 99 |
| 5th Pref. Embodiment | 1.0 | — | 0.2 | — | — | — | — | 0.2 | 92 | 95 | 100 | 59 | 93 | 97 |
| 6th Pref. Embodiment | 1.0 | — | 0.2 | 0.3 | — | 0.1 | — | — | 91 | 95 | 100 | 62 | 93 | 93 |
| 7th Pref. Embodiment | — | 2.0 | 0.2 | 0.3 | — | — | 0.1 | — | 88 | 96 | 100 | 59 | 92 | 97 |
| 8th Pref. Embodiment | — | 2.0 | 0.2 | 0.3 | — | — | — | 0.1 | 86 | 93 | 100 | 58 | 93 | 97 |
| Comp. Example 1 | 1.0 | — | 0.2 | 0.2 | — | — | — | — | 86 | 97 | 100 | 46 | 96 | 98 |
| Comp. Example 2 | 1.0 | — | 0.2 | 0.3 | — | 0.1 | — | — | 88 | 95 | 100 | 44 | 94 | 97 |
| Comp. Example 3 | — | 2.0 | 0.2 | 0.3 | — | — | — | 0.1 | 86 | 95 | 100 | 41 | 94 | 96 |
| Comp. Example 4 | 1.0 | — | — | 0.2 | — | — | — | — | 80 | 92 | 95 | 35 | 92 | 92 | powder with Pt loaded thereon was added to and mixed with a barium acetate aqueous solution. After stirring the mixture, the alumina powder was dried and calcinated, thereby preparing an alumina powder with Pt and Ba loaded thereon.

Then, 150 parts of the alumina powder with Pt and Ba loaded, 34.4 parts of a ceria powder, 150 parts of water, and 45 parts of alumina sol containing alumina in an amount of 10% by weight were mixed, thereby preparing a slurry for coating.

Finally, a plurality of honeycomb substrates 1 formed of cordierite were immersed into the slurry. After taking each of the substrates 1 out of the slurry, each of them was blown to blow away the slurry in excess. Thereafter, each of the substrates 1 was dried at 80° C. for 20 minutes, and each of them was calcinated at 500° C. for 1 hour, thereby producing the exhaust-gases-purifying catalysts of the First Preferred Embodiment.

The coating amount of the slurry was 189 grams with respect to 1 liter of the honeycomb substrate. The loading amount of Pt was 1.0 gram with respect to 1 liter of the honeycomb substrate. The loading amount of Ba was 0.2 moles with respect to 1 liter of the honeycomb substrate. The loading amount of Ce was 0.2 moles with respect to 1 liter of the honeycomb substrate.

Second through Fifth Preferred Embodiments

Except that La, Li, K and Na substituted for the Ba (i.e., the element working as the $NO_x$ storage component), respectively, as summarized in Table 1 below, the exhaust-gases-purifying catalysts of the Second through Fifth Preferred Embodiments had the same arrangement as those of the First Preferred Embodiment, and were produced similarly thereto.

Sixth Preferred Embodiment

Figure 2:
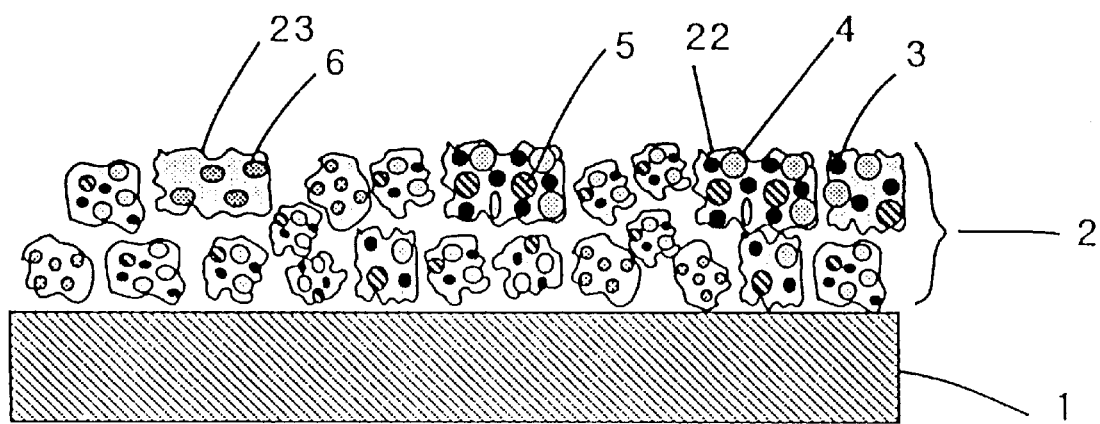
FIG. 2 is an enlarged cross-sectional view on a major portion of an exhaust-gases-purifying catalyst of another preferred embodiment according to the present invention.

In FIG. 2, there is illustrated an enlarged cross-sectional view on a major portion of an exhaust-gases-purifying The coating layer 2 is formed by calcinating a first alumina powder 22 and a second alumina powder 23. On the first alumina powder 22, there are loaded Pt, Ba and Li designated, respectively, at 3, 4 and 5. That is, Pt (designated at 3) is loaded adjacent to Ba and Li (designated, respectively, at 4 and 5) working as the $NO_x$ storage component. On the second alumina powder 23, there is loaded Ce designated at 6.

The exhaust-gases-purifying catalysts of the Sixth Preferred Embodiments were produced in the following manner.

Firstly, an alumina powder was added to a platinum dinitrodiammine aqueous solution. After stirring the mixture, the alumina powder was dried and calcinated, thereby loading Pt thereon. Moreover, the resulting alumina powder with Pt loaded thereon was added to and mixed with a mixed aqueous solution containing barium acetate and lithium nitrate. After stirring the mixture, the alumina powder was dried and calcinated, thereby preparing a first alumina powder with Pt, Ba and Li loaded thereon.

Secondly, another alumina powder was added to a cerium nitrate aqueous solution. After stirring the mixture, the alumina powder was dried and calcinated, thereby preparing a second alumina powder with Ce loaded thereon.

Then, 100 parts of the first alumina powder with Pt, Ba and Li loaded, 50 parts of the second alumina powder with Ce loaded, 140 parts of water, and 45 parts of alumina sol containing alumina in an amount of 10% by weight were mixed, thereby preparing a slurry for coating.

Finally, a plurality of honeycomb substrates 1 formed of cordierite were immersed into the slurry. After taking each of the substrates 1 out of the slurry, each of them was blown to blow away the slurry in excess. Thereafter, each of the substrates 1 was dried at 80° C. for 20 minutes, and each of them was calcinated at 500° C. for 1 hour, thereby producing the exhaust-gases-purifying catalysts of the Sixth Preferred Embodiment.

The coating amount of the slurry was 190 grams with respect to 1 liter of the honeycomb substrate. The loading amount of Pt was 1.0 gram with respect to 1 liter of the honeycomb substrate. The loading amount of Ba was 0.3 moles with respect to 1 liter of the honeycomb substrate. The loading amount of Li was 0.1 mole with respect to 1 liter of the honeycomb substrate. The loading amount of Ce was 0.2 moles with respect to 1 liter of the honeycomb substrate.

Seventh and Eighth Preferred Embodiments

Except that Pd substituted for the Pt, and that K and Na substituted for the Li, respectively, as summarized in Table 1, the exhaust-gases-purifying catalysts of the Seventh and Eighth Preferred Embodiments had the same arrangement as those of the Sixth Preferred Embodiment, and were produced similarly thereto.

Comparative Example No. 1

Except that a coating layer includes an alumina powder and a ceria powder, and that Pt and Ba were loaded uniformly on each of the powders, an exhaust-gases-purifying catalyst of Comparative Example No. 1 had the same arrangement as those of the First through Eighth Preferred Embodiments according to the present invention, though no drawing is illustrated therefor.

The exhaust-gases-purifying catalysts of Comparative Example No. 1 was produced in the following manner.

150 parts of an alumina powder, 45 parts of alumina sol containing alumina in an amount of 10% by weight, 150 parts of water, and 34.4 parts of a ceria powder were stirred to mix, thereby preparing a slurry for coating.

Then, a plurality of honeycomb substrates formed of cordierite were immersed into the slurry. After taking each of the substrates out of the slurry, each of them was blown to blow away the slurry in excess. Thereafter, each of the substrates was dried at 80° C. for 20 minutes, and each of them was calcinated at 500° C. for 1 hour,thereby forming a coating layer thereon.

Finally, each of the honeycomb substrates having the coating layer was immersed into a platinum dinitrodiammine aqueous solution for 1 hour. After taking each of the substrates out of the solution, each of them was dried and calcinated, thereby loading Pt thereon. Further, each of the substrates with Pt loaded thereon was immersed into a barium acetate aqueous solution. After taking each of the substrates out of the solution, each of them was dried at 80° C. for 20 minutes and calcinated at 500° C. for 1 hour, thereby producing the exhaust-gases-purifying catalysts of Comparative Example No. 1.

Comparative Examples Nos. 2 and 3

Except that the noble metal catalyst ingredient and the $NO_x$ storage component were varied and loaded in amounts as set forth in Table 1, the exhaust-gases-purifying catalysts of Comparative Examples Nos. 2 and 3 had the same arrangement as those of Comparative Example No. 1, and were produced similarly thereto.

Comparative Example No. 4

Except that no ceria powder was employed, the exhaust-gases-purifying catalysts of Comparative Example No. 4 had the same arrangement as those of the First Preferred Embodiment, and were produced similarly thereto.

Examination and Evaluation

Each of the catalysts of the First through Eighth Preferred Embodiments and Comparative Examples Nos. 1 through 4 was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the catalysts for the conversion of CO, HC and $NO_x$. The results of the examination are summarized in the columns designated at "Initial Conversion" in Table 1.

After the aforementioned examination, each of the catalysts of the First through Eighth Preferred Embodiments and Comparative Examples Nos. 1 through 4 was subjected to a bench test on durability which utilized the same type of engine as above. Namely, each of them was disposed in an exhaust line of the engine, and then the engine was run at an air-fuel ratio A/F of 18 for 50 hours while adjusting the temperature of the exhaust gas introduced into them at 650° C. After this bench test was over, each of them was again disposed in the exhaust line of the actual vehicle. The vehicle was driven in the same manner as described above, thereby examining the catalysts for the conversion of CO, HC and $NO_x$. The results of the examination are summarized in the columns designated at "Conversion after Durability Test" in Table 1.

As can be appreciated from Table 1, the catalysts of the First through Eighth Preferred Embodiments were superior to the catalysts of Comparative Examples Nos. 1 through 4 in terms of the initial $NO_x$ conversion and the $NO_x$ conversion after the durability test. It is obvious that this advantageous effect resulted from the arrangement that the noble metal catalyst ingredient is load ed adjacent to the $NO_x$ storage component and is separated from the ceria.

By comparing the test results exhibited by the catalysts of the First Preferred Embodiments to those exhibited by the catalysts of Comparative Example No. 4, it is apparent that the $NO_x$ conversion can be improved by loading the ceria, and that the fluctuation in the air-fuel ratio A/F can be reduced or minimized by loading the ceria.

In the catalysts of the First through Eighth Preferred Embodiments, the honeycomb substrate having the alumina coating layer was employed to constitute the porous support. Note that the present invention is not limited thereto. That is, it is possible to form a coating layer with silica, titania, etc. Further, it is possible to make a substrate from one of these porous supports (i.e., alumina, silica, titania, etc.). Furthermore, the shape of the substrate is not limited to the honeycomb shape. For instance, it is possible to form the substrate as a pellet-shaped substrate.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying exhaust gases in oxygen-rich atmospheres in which oxygen concentrations of said exhaust gases are the stoichiometric point or more required for oxidizing components to be oxidized therein, consisting essentially of:

a porous support;

a $NO_x$ storage component loaded on said porous support including at least one member selected from the group consisting of alkaline-earth metals, rare-earth elements and alkali metals;

a noble metal catalyst ingredient loaded substantially exclusively on said porous support; and ceria (CeO$_2$) segregated from said noble metal catalyst ingredient.

2. The catalyst according to claim 1, wherein said porous support includes at least one member selected from the group consisting of alumina, zeolite, zirconia, silica-alumina, silica and the combinations thereof.

3. The catalyst according to claim 2, wherein said porous support is constituted by at least one member selected from the group consisting of alumina, zeolite, zirconia, silica-alumina, silica and the combinations thereof.

4. The catalyst according to claim 2, wherein said porous support is coated by at least one member selected from the group consisting of alumina, zeolite, zirconia, silica-alumina, silica and the combinations thereof.

5. The catalyst according to claim 1, wherein said NO$_x$ storage component is at least one alkaline-earth metal selected from the group consisting of barium (Ba), beryllium (Be), magnesium (Mg), calcium (Ca) and strontium (Sr).

6. The catalyst according to claim 1, wherein said NO$_x$ storage component is at least one rare-earth element selected from the group consisting of scandium (Sc), yttrium (Y), lanthanum (La), cerium (Ce), praseodymium (Pr) and neodymium (Nd).

7. The catalyst according to claim 1, wherein said NO$_x$ storage component is at least one alkali metal selected from the group consisting of lithium (Li), sodium (Na), potassium (K), rubidium (Rb), cesium (Cs) and francium (Fr).

8. The catalyst according to claim 1, wherein said NO$_x$ storage component is loaded in an amount which is effective to store nitrogen oxide (NO$_x$) in exhaust gases whose oxygen concentrations are at the stoichiometric point or more than required for oxidizing carbon monoxide (CO) and hydrocarbons (HC).

9. The catalyst according to claim 8, wherein said NO$_x$ storage component is loaded in amount of from 0.025 to 0.5 moles with respect to 1 liter of said porous support.

10. The catalyst according to claim 1, wherein said noble metal catalyst ingredient is at least one element selected from the group consisting of Pt, Rh and Pd.

11. The catalyst according to claim 1, wherein said noble metal catalyst ingredient is loaded in an amount which is effective to purify NO$_x$, CO and HC in exhaust gases whose oxygen concentrations are at the stoichiometric point or more than required for oxidizing CO and HC.

12. The catalyst according to claim 11, wherein said noble metal catalyst ingredient is loaded in an amount of from 0.1 to 20 grams with respect to 1 liter of said porous support.

13. The catalyst according to claim 1, wherein said ceria is loaded in an amount which is effective to store oxygen in exhaust gases whose oxygen concentrations are at the stoichiometric point or more than required for oxidizing CO and HC.

14. The catalyst according to claim 13, wherein said ceria is loaded in an amount of from 0.025 to 0.5 moles with respect to 1 liter of said porous support.

15. A catalyst for purifying exhaust gases in oxygen-rich atmospheres, consisting essentially of;
    a first porous support powder;
    a NO$_x$ storage component loaded on said first porous support powder including at least one member selected from the group consisting of alkaline-earth metals, rare-earth elements and alkali metals;
    a noble metal catalyst ingredient loaded substantially exclusively on said first porous support powder;
    a second porous support powder segregated from said first porous support powder; and
    ceria (CeO$_2$) loaded on said second porous support powder.

16. A process for purifying an exhaust gases from a lean burn engine, said process comprising:
    simultaneously removing carbon monoxide, hydrocarbons and nitrogen oxides by bringing said exhaust gas from a lean burn engine into contact with an exhaust gas purifying catalyst consisting essentially of;
    a porous support;
    a NO$_x$ storage component loaded on said porous support including at least one member selected from the group consisting of alkaline-earth metals, rare-earth elements and alkali metals;
    a noble metal catalyst ingredient loaded substantially exclusively on said porous support; and
    ceria (CeO$_2$) segregated from said noble metal catalyst ingredient,
    wherein a majority of said nitrogen oxides in said exhaust gas are adsorbed to said NO$_x$ storage component on said porous support under a lean burn atmosphere in which oxidizing concentrations are above a stoichiometric point that is required for oxidizing components to be oxidized in said exhaust gas, said exhaust gas is temporarily changed from lean burn to fuel-rich, and said adsorbed nitrogen oxides are released and chemically reduced by a reaction with said hydrocarbons and carbon monoxide in said exhaust gas under a stoichiometric atmosphere or a fuel-rich atmosphere in which oxygen concentrations are below said stoichiometric point.

17. The process according to claim 16, wherein said porous support includes at least one member selected from the group consisting of alumina, zeolite, zirconia, silica-alumina, silica and the combinations thereof.

18. The process according to claim 17, wherein said porous support is constituted by at least one member selected from the group consisting of alumina, zeolite, zirconia, silica-alumina, silica and the combinations thereof.

19. The process according to claim 17, wherein said porous support is coated by at least one member selected from the group consisting of alumina, zeolite, zirconia, silica-alumina, silica and the combinations thereof.

20. The process according to claim 16, wherein said NO$_x$ storage component is at least one alkaline-earth metal selected from the group consisting of barium (Ba), beryllium (Be), magnesium (Mg), calcium (Ca) and strontium (Sr).

21. The process according to claim 16, wherein said NO$_x$ storage component is at least one rare-earth element selected from the group consisting of scandium (Sc), yttrium (Y), lanthanum (La), cerium (Ce), praseodymium (Pr) and neodymium (Nd).

22. The process according to claim 16, wherein said NO$_x$ storage component is at least one alkali metal selected from the group consisting of lithium (Li), sodium (Na), potassium (K), rubidium (Rb), cesium (Cs) and francium (Fr).

23. The process according to claim 16, wherein said NO$_x$ storage component is loaded in an amount which is effective to store nitrogen oxide (NO$_x$) in exhaust gases whose oxygen concentrations are at the stoichiometric point or more than required for oxidizing carbon monoxide (CO) and hydrocarbons (HC).

24. The process according to claim 23, wherein said NO$_x$ storage component is loaded in amount of from 0.025 to 0.5 moles with respect to 1 liter of said porous support.

25. The process according to claim 16, wherein said noble metal catalyst ingredient is at least one element selected from the group consisting of Pt, Rh and Pd.

26. The process according to claim 16, wherein said noble metal catalyst ingredient is loaded in an amount which is effective to purify $NO_x$, CO and HC in exhaust gases whose oxygen concentrations are at the stoichiometric point or more than required for oxidizing CO and HC.

27. The process according to claim 26, wherein said noble metal catalyst ingredient is loaded in an amount of from 0.1 to 20 grams with respect to 1 liter of said porous support.

28. The process according to claim 16, wherein said ceria is loaded in an amount which is effective to store oxygen in exhaust gases whose oxygen concentrations are at the stoichiometric point or more than required for oxidizing CO and HC.

29. The process according to claim 28, wherein said ceria is loaded in an amount of from 0.025 to 0.5 moles with respect to 1 liter of said porous support.

30. The process according to claim 16, wherein said porous support comprises a first porous support powder with said noble metal catalyst ingredient and said $NO_x$ storage component loaded, and a second porous support powder with said ceria loaded.

31. The process according to claim 16, wherein said porous support comprises a porous support powder with said noble metal catalyst ingredient and said $NO_x$ storage component loaded, and a ceria powder.

32. A process for purifying an exhaust gases from a lean burn engine, said process comprising:

simultaneously removing carbon monoxide, hydrocarbons and nitrogen oxides by bringing said exhaust gas from a lean burn engine into contact with an exhaust gas purifying catalyst consisting essentially of:

a first porous support powder;

a $NO_x$ storage component loaded on said first porous support powder including at least one member selected from the group consisting of alkaline-earth metals, rare-earth elements and alkali metals;

a noble metal catalyst ingredient loaded substantially exclusively on said first porous support powder;

a second porous support powder; and ceria ($CeO_2$) loaded on said second porous support powder, wherein a majority of said nitrogen oxides in said exhaust gas are adsorbed to said $NO_x$ storage component on said first porous support under a lean burn atmosphere in which oxidizing concentrations are above a stoichiometric point that is required for oxidizing components to be oxidized in said exhaust gas, said exhaust gas is temporarily changed from lean burn to fuel-rich, and said adsorbed nitrogen oxides are released and chemically reduced by a reaction with said hydrocarbons and carbon monoxide in said exhaust gas under a stoichiometric atmosphere or a fuel-rich atmosphere in which oxygen concentrations are below said stoichiometric point.

* * * * *